(12) United States Patent
Kim et al.

(10) Patent No.: US 7,563,530 B2
(45) Date of Patent: Jul. 21, 2009

(54) FUEL AMOUNT CONTROL SYSTEM FOR FUEL CELL

(75) Inventors: Hae-Kyoung Kim, Suwon-si (KR);
Kyoung-Hwan Choi, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 557 days.

(21) Appl. No.: 10/820,822

(22) Filed: Apr. 9, 2004

(65) Prior Publication Data

US 2004/0202906 A1 Oct. 14, 2004

(30) Foreign Application Priority Data

Apr. 11, 2003 (KR) .................... 10-2003-0023066

(51) Int. Cl.
*H01M 8/04* (2006.01)
*H01M 8/12* (2006.01)
*G01N 33/00* (2006.01)
*G01N 37/00* (2006.01)
*G01N 7/00* (2006.01)
*G01N 33/18* (2006.01)
*G01R 27/28* (2006.01)
*G01R 27/08* (2006.01)

(52) U.S. Cl. .................. 429/25; 429/22; 73/61.41; 73/61.47; 73/61.78; 324/717; 324/649

(58) Field of Classification Search .............. 429/25, 429/22; 324/691, 717; 73/64.41, 61.47, 73/61.78, 61.76

See application file for complete search history.

(56) References Cited

U.S. PATENT DOCUMENTS

| | | | | |
|---|---|---|---|---|
| 5,033,293 A | * | 7/1991 | Honma et al. | 73/118.1 |
| 6,303,244 B1 | * | 10/2001 | Surampudi et al. | 429/17 |
| 6,306,285 B1 | * | 10/2001 | Narayanan et al. | 205/787 |
| 6,488,837 B1 | | 12/2002 | Ren et al. | 205/787 |
| 6,686,081 B2 | * | 2/2004 | Gottesfeld | 429/30 |
| 6,890,674 B2 | * | 5/2005 | Beckmann et al. | 429/24 |

(Continued)

FOREIGN PATENT DOCUMENTS

JP           57-196479           12/1982

(Continued)

*Primary Examiner*—Patrick Ryan
*Assistant Examiner*—Eugenia Wang
(74) *Attorney, Agent, or Firm*—H.C. Park & Associates, PLC

(57) ABSTRACT

A fuel amount control system of a fuel cell includes a fuel storage unit that stores the fuel to be supplied to the anode, a diluent storage unit that stores a diluent generated as a result of the chemical reaction in the cathode, a fuel mixing unit that mixes the fuel supplied from the fuel storage unit and the diluent supplied from the diluent storage unit to supply a fuel mixture solution to the anode, a sensor located inside the fuel mixing unit, which has a various volume that depends on the concentration of the fuel in the fuel mixture solution and outputs an electrical signal according to a volume variation, and a control unit that receives the electrical signal output from the sensor and outputs electrical signals to open and close the fuel storage unit and the diluent storage unit such that the fuel mixture solution having an appropriate concentration is supplied from the fuel mixing unit to the fuel cell stack.

6 Claims, 5 Drawing Sheets

U.S. PATENT DOCUMENTS

| | | | |
|---|---|---|---|
| 2001/0037000 A1* | 11/2001 | Goto et al. ................. | 525/242 |
| 2002/0105345 A1* | 8/2002 | Yasuda et al. ............... | 324/691 |
| 2002/0119353 A1* | 8/2002 | Edlund et al. ................ | 429/19 |
| 2003/0091887 A1* | 5/2003 | Ihonen et al. ................ | 429/38 |

FOREIGN PATENT DOCUMENTS

| | | |
|---|---|---|
| JP | 63-091546 | 4/1988 |
| JP | 8-91804 | 4/1996 |
| JP | 11-510311 | 9/1999 |
| JP | 2002-509609 | 3/2002 |
| JP | 2003-507859 | 2/2003 |
| KR | 10-2002-0056136 | 7/2002 |
| WO | WO 01/23874 A1 | 4/2001 |

* cited by examiner

FUEL AMOUNT CONTROL SYSTEM FOR FUEL CELL

BACKGROUND OF THE INVENTION

This application claims the priority of Korean Patent Application No. 2003-23066, filed on Apr. 11, 2003, in the Korean Intellectual Property Office, the disclosure of which is incorporated herein in its entirety by reference.

1. Field of the Invention

The present invention relates to a fuel amount control system for a fuel cell, which includes a sensor, and more particularly, to a fuel amount control system suitable for a smaller fuel cell, which includes a small sensor to measure the concentration of fuel supplied to the fuel cell to maintain a constant fuel concentration.

2. Description of the Related Art

Fuel cells are electrochemical systems in which a free energy change resulting from fuel oxidation and reduction is converted into electrical energy. A fuel cell consists of three elements, i.e., an anode where an oxidation reaction takes place, a cathode where a reduction reaction takes place, and an electrolyte disposed between the anode and the cathode to carry ions. In the anode, a fuel, such as hydrogen or methanol, loses electrons and is transformed into cations. In the cathode, oxygen ions in air accept the electrons supplied from the anode and produce water.

Fuel cells that directly utilize liquid methanol as a fuel source are called direct methanol fuel cells (DMFCs). In DMFCs, a mixture of methanol and water in a predetermined ratio is directly supplied to an anode of a fuel cell stack, so that a separate fuel modifier is not required and the fuel cell system has a smaller size. However, when a concentration of a methanol solution supplied to the stack is beyond an appropriate range, the overall energy generation efficiency of the fuel cell decreases. Conventionally, using various kinds of sensors capable of detecting the concentration of the methanol solution supplied to the anode have been suggested to improve the performance of DMFCs.

U.S. Pat. No. 6,303,244 discloses a methanol sensor attached to a fuel tank but does not disclose a detailed method of detecting the concentration of methanol. U.S. Pat. No. 6,488,837 discloses a method of measuring methanol concentration by using a current sensor that outputs an electrical signal depending on methanol concentration and is connected to a small circuit that traverses a cathode and an anode. International Patent No. 0123,874 discloses a method of measuring methanol concentration, in which a portion of a methanol solution is extracted from a fuel cell and heated to the boiling point prior to measurement. Korean Patent Publication No. 2002-0056136 discloses a sensor that detects methanol concentration based on variations in the absorbance of a methanol solution.

In the above patents, a separate methanol sensor increases the size of the fuel cell system. In addition, there is no prominent improvement in energy efficiency.

SUMMARY OF THE INVENTION

The present invention provides a fuel amount control system suitable for a highly efficient, small-size fuel cell.

The present invention discloses a fuel amount control system for supplying a fuel to a fuel cell stack that includes an anode and a cathode and generates electrical energy by a chemical reaction of the fuel. The fuel amount control system includes a fuel storage unit that stores the fuel to be supplied to the anode, a diluent storage unit that stores a diluent generated as a result of the chemical reaction in the cathode, a fuel mixing unit that mixes the fuel supplied from the fuel storage unit and the diluent supplied from the diluent storage unit to supply a fuel mixture solution to the anode, a sensor located inside the fuel mixing unit, and a control unit that receives the electrical signal output from the sensor and outputs electrical signals to open and close the fuel storage unit and the diluent storage unit such that the fuel mixture solution having an appropriate concentration is supplied from the fuel mixing unit to the fuel cell stack. The sensor changes its volume depending on the fuel concentration in the fuel mixture solution and outputs an electrical signal accord to a volume variation.

The present invention also provides a fuel amount control system that may further include a pipeline connected between the fuel storage unit and the diluent storage unit, which supplies a fuel mixture solution including the fuel supplied from the fuel storage unit and the diluent supplied from the diluent storage unit in an appropriate ration to the fuel cell stack and a pressure sensor located inside the pipeline.

In the above fuel amount control systems according to the present invention, the sensor may include a substrate and a sensor film attached to a surface of the substrate. The pressure film varies its volume depending on the concentration of the fuel mixture solution. The pressure sensor may also include an external electrode, an internal electrode, and a pressure member that fills the space between the internal electrode and the external electrode. The pressure member changes its volume depending on the concentration of the fuel mixture solution.

The sensor may be manufactured using polymeric ion exchange membrane or resin. The sensor may include an electronic circuit that outputs an electrical signal depending on a change in the volume of the sensor.

As described above, a fuel amount control system according to the present invention includes a small sensor that can simply measure the concentration of fuel. Therefore, a smaller fuel cell with higher energy efficiency can be manufactured using the sensor.

BRIEF DESCRIPTION OF THE DRAWINGS

The above and other features and advantages of the present invention will become more apparent by describing in detail exemplary embodiments thereof with reference to the attached drawings.

DETAILED DESCRIPTION OF THE INVENTION

Embodiments of a fuel amount control system for a fuel cell according to the present invention will be described in detail with reference to the appended drawings.

Figure 1:
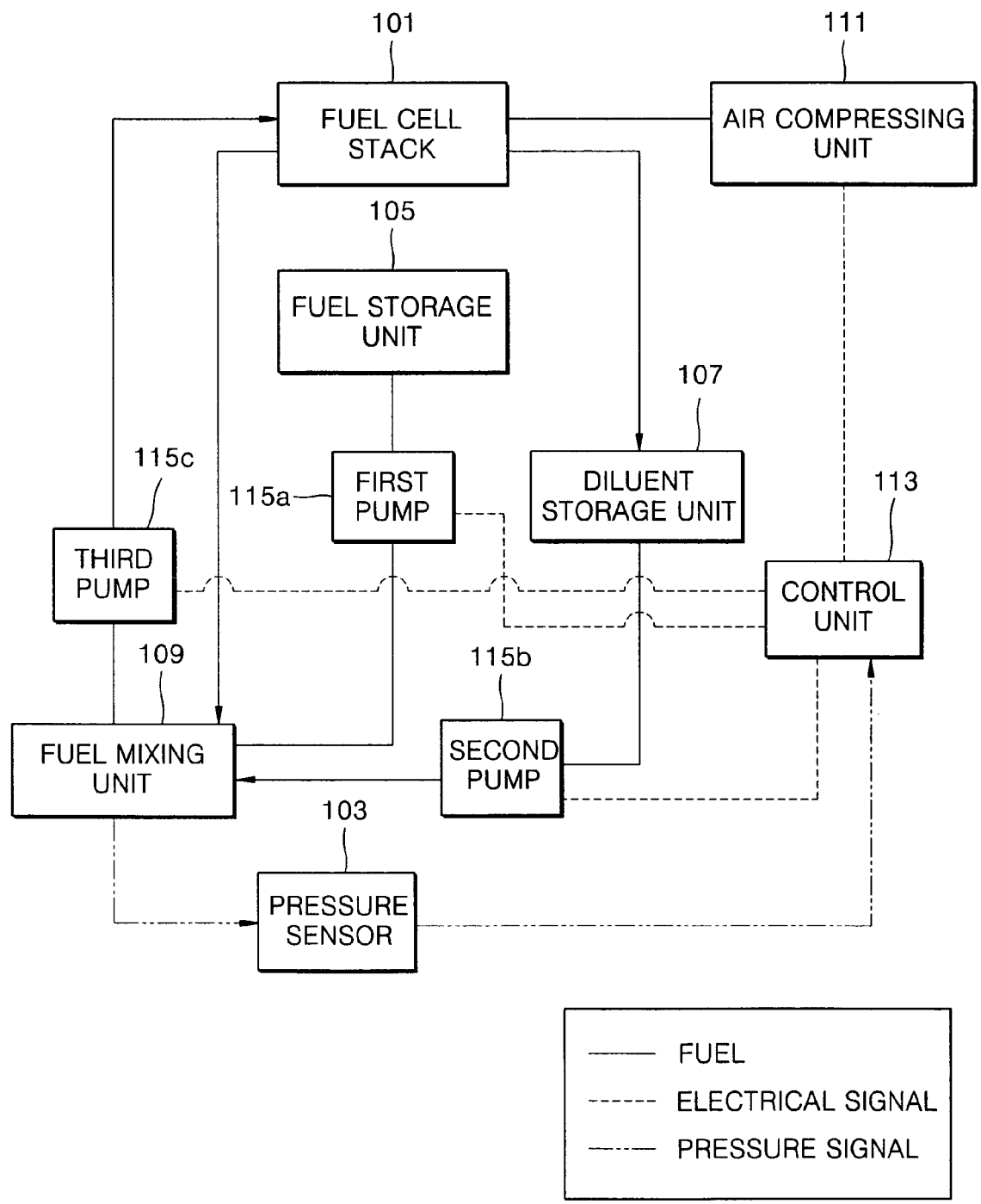
FIG. 1 illustrates the the structure of a fuel amount control system of a fuel cell according to an embodiment of the present invention.

FIG. 1 shows the structure of a fuel amount control system according to an embodiment of the present invention. A fuel mixing unit 109 is connected to a fuel cell stack 101 and supplies a fuel to it. A fuel storage unit 105 is connected to the fuel mixing unit 109 through first pump 115a. A diluent storage unit 107 stores the byproduct of an electrochemical reaction that takes place in a cathode of the fuel cell stack 101 to use it as a fuel diluent. An air compressing unit 111 supplies air as a fuel oxidant and is connected to the fuel cell stack 101. The air compressing unit 111 may be replaced by a unit that supplies oxidants other than air.

A first pump 115a is connected between the fuel storage unit 105 and the fuel mixing unit 109 to adjust the amount of diluent supplied to the fuel mixing unit 109. A second pump 115b is connected between the diluent storage unit 107 and the fuel mixing unit 109 to adjust the amount of fuel applied to the fuel mixing unit 109. A third pump 115c is connected between the fuel mixing unit 109 and the fuel cell stack 101 to adjust the amount of a fuel mixture supplied to the fuel cell stack 101. A fuel mixture that was sent to the fuel cell stack 101 but was not used for the chemical reaction is collected back into the fuel mixing unit 109. The byproduct of the oxidation and reduction reactions, for example, water, flows into the diluent storage unit 107 and is used as fuel diluent.

The first pump 115a, the second pump 115b, and the third pump 115c and the air compressing unit 111 are controlled by electrical signals output from a control unit 113. These electrical signals are output from the control unit 113 in response to a pressure signal that is output from a sensor 103 located inside the fuel mixing unit 109.

The volume of the sensor 103 varies depending on the concentration of the fuel mixture contained in the fuel mixing unit 109. The pressure sensor 103 includes an electronic circuit that detects a change in the volume of the sensor 103 and converts it into an electrical signal. The control unit 113 may include a calculator that calculates the concentration of the fuel mixture using the electrical signal and a comparator that compares the calculated concentration of the fuel mixture with a previously stored reference concentration value.

When the electrical signal amplified by and output from the electronic circuit is received, the control unit 113 converts the received electrical signal into a concentration value of the fuel mixture. If the concentration value of the fuel mixture is greater than the reference concentration value, the control unit 113 opens the second pump 115b and closes the first pump 115a to lower the concentration of the fuel mixture supplied to the fuel mixing unit 109. If the concentration value of the fuel mixture is smaller than the reference concentration value, the control unit 113 opens the first pump 115a and closes the second pump 115b to stop supplying the diluent to the fuel mixing unit 109 and increase the concentration of the fuel mixture in the fuel mixing unit 109.

Typically, direct methanol fuel cells (DMFCs) utilize methanol as a fuel and water generated in the cathode as a diluent. The methanol mixture supplied from the fuel mixing unit 109 of the fuel amount control system diffuses into the entire anode of a membrane-electrode assembly (MEA) of the fuel cell stack 101, inducing an electrochemical oxidation as illustrated in formula (1) below. Air supplied from the air compressing unit 111 to the fuel cell stack 101 diffuses into the entire cathode of the MEA, inducing an electrochemical reduction as illustrated in formula (2) below. Electrical energy is generated by the migration of electrons generated during the reactions and collected by a current collector plate. The reactions illustrated in formulae (1) and (2) can be expressed as formula (3) below.

$$CH_3OH + H_2O \rightarrow CO_2 + 6H^+ + 6e^- \quad (1)$$

$$\frac{3}{2}O_2 + 6H^+ + 6e^- \rightarrow 3H_2O \quad (2)$$

$$CH_3OH + \frac{3}{2}O_2 + H_2O \rightarrow CO_2 + 3H_2O \quad (3)$$

Figure 2:
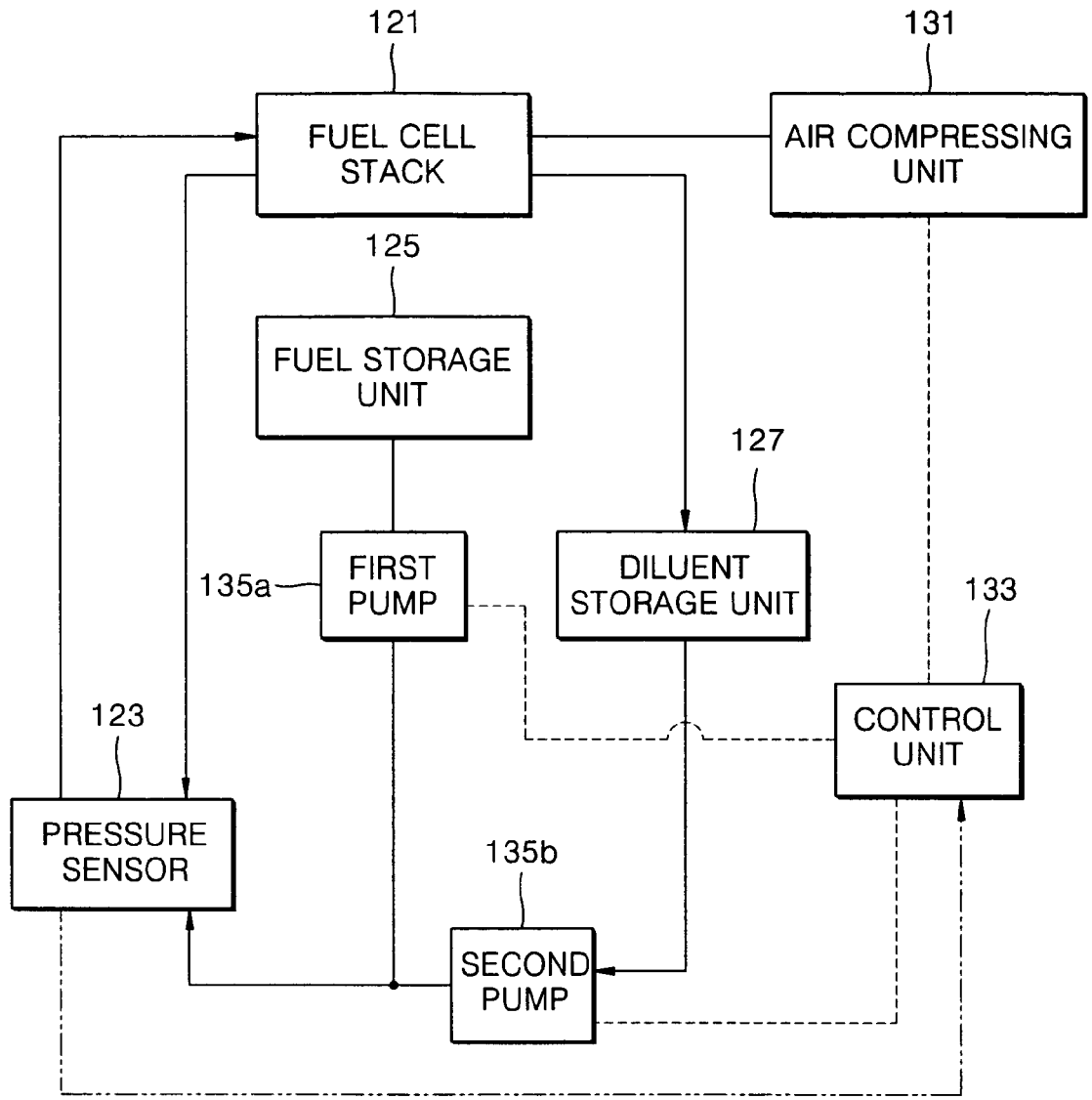
FIG. 2 illustrates the structure of a fuel amount control system of a fuel cell according to anther embodiment of the present invention.

FIG. 2 illustrates the structure of a fuel amount control system for a fuel cell according to another embodiment of the present invention. In FIG. 2, reference numeral 121 denotes a fuel cell stack, reference numeral 123 denotes a sensor, reference numeral 125 denotes a fuel storage unit, reference numeral 127 denotes a diluent storage unit 127, reference numeral 131 denotes an air compressing unit, reference numeral 133 denotes a control unit, reference numeral 135a denotes a first pump, and reference numeral 135b denotes a second pump. The functions of these elements of the fuel amount control system in FIG. 2 are the same as the functions of the corresponding elements of the fuel amount control system illustrated in FIG. 1.

Unlike the fuel amount control system illustrated in FIG. 1, the fuel amount control system of FIG. 2 does not include a fuel mixing unit. The sensor 123 is located inside a pipeline (not shown) that provides a fuel supplied from the fuel storage unit 125 and a diluent supplied from the diluent storage unit 127. It measures the concentration of a mixture of the fuel and the diluent. The control unit 133 outputs electrical signals to control the first pump 135a and the second pump 135b in response to a pressure signal output from the pressure sensor 123. The above-described fuel amount control systems according to the present invention may include various types of sensors as follows.

Figure 3:
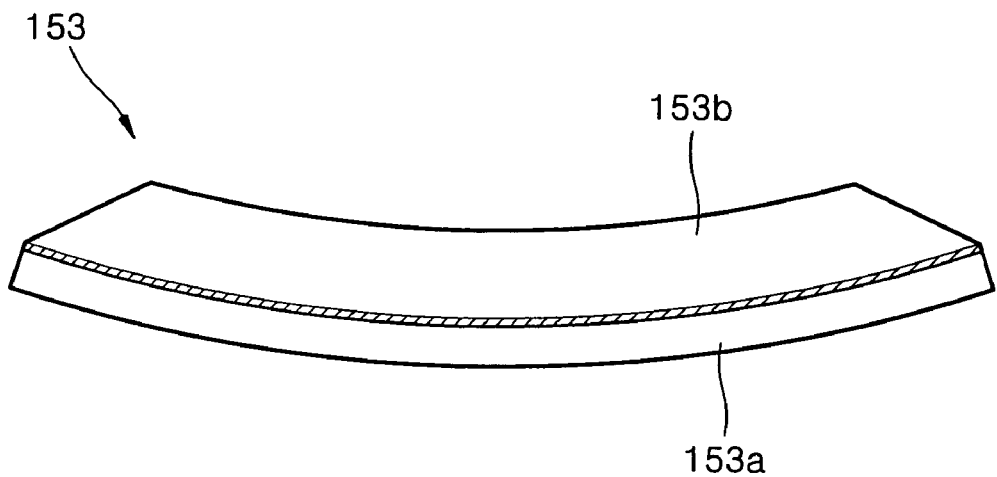
FIG. 3 illustrates an example of a sensor that may be used in a fuel amount control system according to the present invention.

FIG. 3 illustrates an example of a sensor that may be used in a fuel amount control system according to the present invention. Referring to FIG. 3, a sensor 153 includes a substrate 153a and a pressure film 153b attached to a surface of the substrate 153a. The volume of the pressure film 153b varies depending on the concentration of a fuel mixture that contacts the pressure sensor 153.

In a fuel cell that utilizes methanol as a fuel, such as a DMFC, a perfluorinated cation exchange resin, for example, Nafion (a registered trademark of E.I. DuPont), may be used as the pressure film 153b. Nafion, which is a polymeric ion exchange membrane, is widely used as an electrolyte membrane in the MEA of a DMFC. In practice, the swelling of Nafion in a DMFC is considered as a factor that deteriorates a performance of the fuel cell. However, in the present invention, a sensor that can effectively measure the concentration of a methanol solution is implemented based on the swelling property of Nafion. Alternatively, an ion-conductive polymer resin or composite resin, for example, polystyrene sulfonic acid, poly ether ether sulfone sulfonic acid, perfluorinated sulfonic acid polymer, of polyimide sulfonic acid, can be used. Sulfonated polyolefin and sulfonated polysulfone, both of which vary their volumes depending on the concentration of fuel, such as a methanol solution, may be used as the pressure film 153b.

Figure 5:
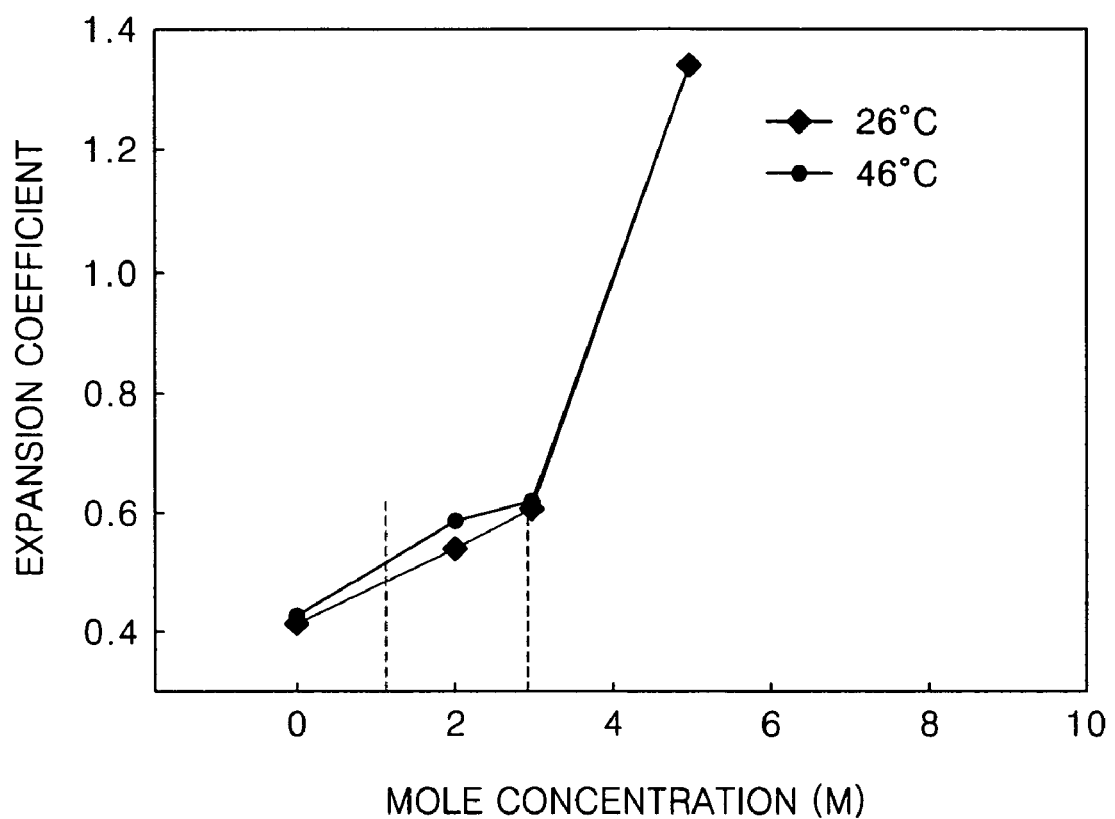
FIG. 5 is a graph of expansion coefficient of the sensor of FIG. 3 versus concentration of a methanol solution.

Table 1 shows the variation in the expansion coefficient ($\Delta V/Vo$) of the pressure sensor having the structure of FIG. 3, which was manufactured using Nafion 115, with respect to the concentration of a methanol solution at 26° C. and 46° C. FIG. 5 is a graph of the expansion coefficient of the pressure sensor of FIG. 3 versus the concentration of a methanol solution using the data in Table 1.

TABLE 1

| Concentration | Time | | 26° C. | | | (unit: mm$^2$) 46° C. |
|---|---|---|---|---|---|---|
| 2 M | 1 min | 388.8 | Vo = 252.77 | 303.36 | | Vo = 191.8 |
|  | 4 min | 388.8 | Δ V/Vo = 0.53815 | 303.36 | | Δ V/Vo = 0.53815 |
| 3 M | 1 min | 375.376 | Vo = 233.22 | 248.85 | | Vo = 153.5625 |
|  | 4 min | 375.375 | Δ V/Vo = 0.609532 | 248.85 | | Δ V/Vo = 0.53815 |
| 4 M | 1 min | 233.84 | Vo = 99.92 | 240 | | Vo = 102.475 |
|  | 4 min | 233.84 | Δ V/Vo = 1.339336 | 240 | | Δ V/Vo = 0.53815 |

As shown in Table 1, the expansion coefficient (ΔV/Vo) of the sensor increases in proportion to the mole concentration of the methanol solution at the same temperature, but there is no change in volume with respect to time, i.e., after 1 minute and 4 minutes, at the same concentration, supporting the reliability of the pressure sensor according to the present invention. The pressure sensor manufactured for this test according to the present invention can precisely measure the concentration of a fuel mixture independent of a duration of contact.

Referring to FIG. 5, the expansion coefficient (ΔV/Vo) of the sensor is slightly greater at 46° C. than at 26° C. in the concentration range from 1M to 3M.

The reaction heat generated by the fuel cell stack of a DMFC raises the temperatures of supplied methanol and collected water, causing the pressure sensor inside the DMFC to expand. Accordingly, when measuring the concentration of a fuel using a pressure sensor according to the present invention, it is necessary to consider an error margin of expansion coefficients to compensate for a rise in fuel temperature.

For example, when the concentration of a standard methanol solution ranges from 1M to 3M, a reference range of expansion coefficients of the sensor can be set to be between 0.45 and 0.6 based on the experimental data of Table 1 and FIG. 5. When an expansion coefficient calculated from the signals coming from the sensor does not lie within the above reference range, the control unit 113 (133) outputs an electrical signal to open or close the pumps connected to the fuel storage unit and the diluent storage unit, respectively, and control the concentration of a fuel within an appropriate range.

Figure 4:
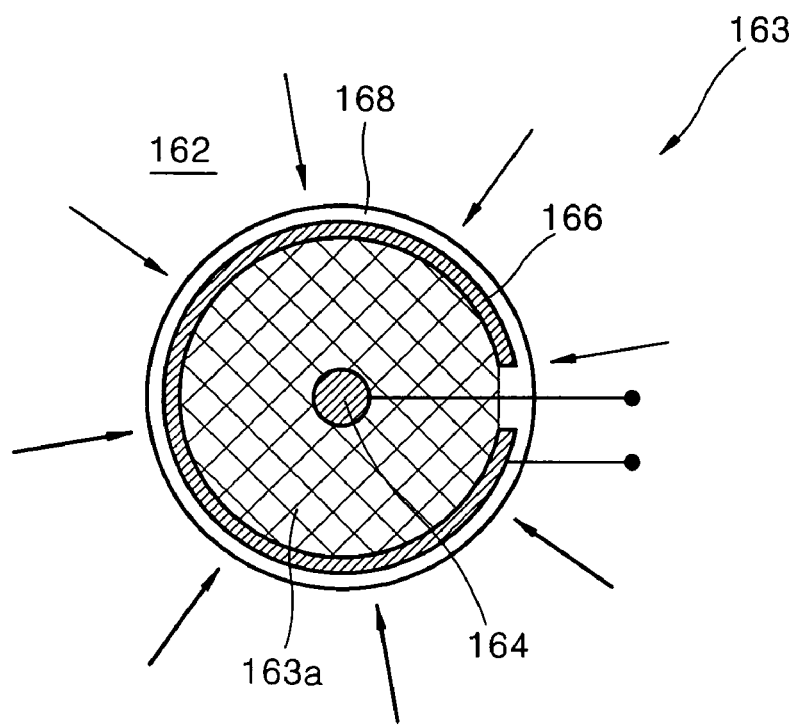
FIG. 4 illustrates another example of a sensor that may be used in a fuel amount control system according to the present invention.

FIG. 4 illustrates another example of a sensor that may be used in a fuel amount control system according to the present invention. Referring to FIG. 4, a sensor 163 that is shaped like a ball is immersed in a mixed fuel solution 162. The sensor 163 includes an internal electrode 164 and an external electrode 166 surrounding the internal electrode 164, and a pressure member 163a that fills the space between the internal electrode 164 and the external electrode 166. An insulating layer 168 is formed on the surface of the external electrode 166. The pressure member 163a is an elastic member. The pressure member 163a may be made of a semiconductor material, a graphite-containing latex, or Nafion, with Nafion being preferred. Any material that changes its volume depending on the concentration of the mixed fuel solution 162 may be used for the pressure member 163a, without limitation to the above-listed materials.

The elastic resistance of the pressure member 163a varies with respect to the volume of the pressure member 163 and affects a current that flows across the internal electrode 164 and the external electrode 166. The sensor 163 includes an electronic circuit connected to the control unit. The electronic circuit of the sensor 163 outputs an electrical signal depending on a change in current that corresponds to a concentration variation or expansion coefficient variation.

A conventional fuel cell can generate electrical energy by using only 1.5 L of a 2M-methanol solution that corresponds to only 96 g of pure methanol. However, the fuel amount control system according to the present invention using the sensor can utilize 1.5 L of pure methanol that is equivalent to 1170 g (1500×0.78) by circulating water produced from a fuel cell stack and produce 12 times greater electrical energy compared to the conventional fuel cell that utilizes the 2M-methanol solution. In other words, when using the fuel cell amount control system according to the present invention, electrical energy can be generated using one twelfth less methanol compared to the conventional fuel cell. Therefore, the size of fuel cells can be remarkably reduced.

Figure 6:
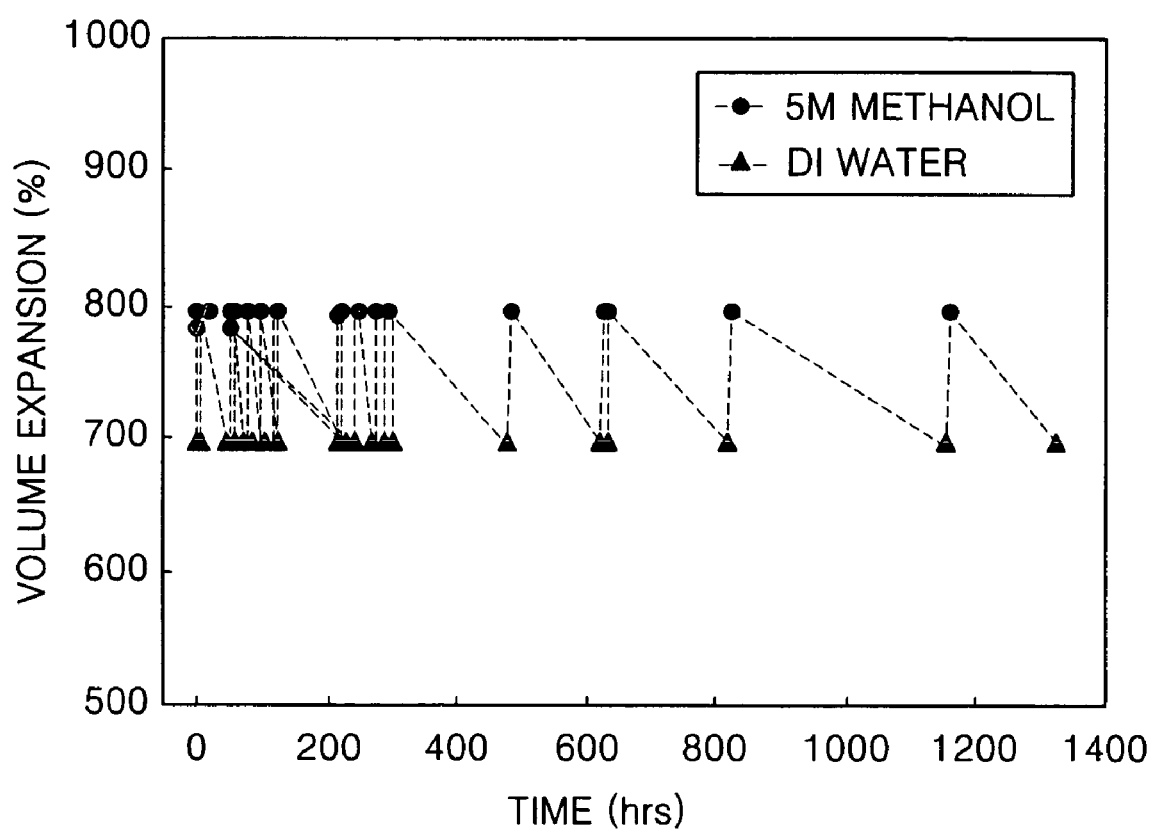
FIG. 6 is a graph of volume expansion percentage of a sensor according to the present invention versus time, in which the sensor was manufactured using a polymer which has cation exchange sites (Nafion 115) and was dipped in deionized (DI) water and a 5M-methanol solution.

FIG. 6 is a graph of volume expansion percentage of a sensor according to the present invention versus time, in which the sensor was manufactured using Nafion 115 and was dipped in deionized (DI) water and 5M-methanol solution. Referring to FIG. 6, the volume expansion of the sensor in both DI water and 5M-methanol solution is independent of time. Evidently, the concentration of a methanol solution can be measured reliably with the sensor according to the present invention that is manufactured using Nafion.

While the present invention has been particularly shown and described with reference to exemplary embodiments thereof, it will be understood by those of ordinary skill in the art that various changes in form and details may be made therein, for example, using various optical or optoacoustic sensors, without departing from the spirit and scope of the present invention as defined by the following claims.

What is claimed is:

1. A control system for supplying a fuel to a fuel cell stack that includes an anode and a cathode and generates electrical energy by a chemical reaction of the fuel, comprising:
   a fuel storage unit that stores the fuel to be supplied to the fuel cell stack;
   a diluent storage unit that stores only a diluent that is a byproduct of the chemical reaction in the fuel cell stack;
   a sensor that detects a concentration of a fuel in a fuel mixture solution and outputs a signal according to the concentration; and
   a control unit that receives the signal from the sensor and controls the fuel mixture solution,
   wherein the diluent comprises $H_2O$, and
   wherein the sensor comprises:
      an external electrode;
      an internal electrode; and
      a sensor member that fills the space between the internal electrode and the external electrode, wherein the sensor member changes volume thereof depending on the concentration of the fuel mixture solution.

2. The control system of claim 1, wherein the sensor is manufactured using polymeric ion exchange membrane or resin.

3. The control system of claim 2, wherein the polymeric ion exchange membrane or resin is one of polystyreme sulfonic acid, poly ether ether sulfone sulfonic acid, perfluorinated sulfonic acid polymer, polyimide sulfonic acid, sulfonated polyolefin and sulfonated polysulfane.

4. The control system of claim 1, wherein the sensor comprises an electronic circuit that outputs an electrical signal depending on a change in the volume of the sensor member.

5. The control system of claim 1, wherein the signal is output when an expansion coefficient of the sensor member is not within a reference range of expansion coefficients of the sensor member.

6. A sensor for a fuel concentration in a fuel cell comprising:
an external electrode;
an internal electrode; and
a sensor member that fills the space between the internal electrode and the external electrode,
wherein the sensor member changes volume thereof depending on a concentration of fuel in fuel mixture, and
wherein a signal is output when an expansion coefficient of the sensor is not within a reference range.

* * * * *